United States Patent
Ha et al.

(10) Patent No.: US 12,545,715 B2
(45) Date of Patent: Feb. 10, 2026

(54) REFINING METHOD OF OPHTHALMIC AFLIBERCEPT

(71) Applicant: SAM CHUN DANG PHARM. CO., LTD., Hwaseong-si (KR)

(72) Inventors: Byung-Jhip Ha, Yongin-si (KR); Yong-Seop Park, Seongnam-si (KR); Mee-Ran Seo, Suwon-si (KR); Jae-Ho Lee, Suwon-si (KR); Dong-Kyu Kim, Suwon-si (KR); Jae-In Jeong, Suwon-si (KR)

(73) Assignee: SAM CHUN DANG PHARM. CO., LTD., Hwaseong-si (KR)

( * ) Notice: Subject to any disclaimer, the term of this patent is extended or adjusted under 35 U.S.C. 154(b) by 1062 days.

(21) Appl. No.: 17/625,528

(22) PCT Filed: Sep. 9, 2019

(86) PCT No.: PCT/KR2019/011642
§ 371 (c)(1),
(2) Date: Jan. 7, 2022

(87) PCT Pub. No.: WO2021/006419
PCT Pub. Date: Jan. 14, 2021

(65) Prior Publication Data
US 2022/0267411 A1     Aug. 25, 2022

(30) Foreign Application Priority Data

Jul. 8, 2019 (KR) .................. 10-2019-0082061

(51) Int. Cl.
| | | |
|---|---|---|
| *C07K 14/71* | (2006.01) | |
| *A61K 9/00* | (2006.01) | |
| *A61K 47/12* | (2006.01) | |
| *A61K 47/14* | (2017.01) | |
| *A61K 47/26* | (2006.01) | |
| *C07K 1/18* | (2006.01) | |

(52) U.S. Cl.
CPC ............ *C07K 14/71* (2013.01); *A61K 9/0019* (2013.01); *A61K 47/12* (2013.01); *A61K 47/14* (2013.01); *A61K 47/26* (2013.01); *C07K 1/18* (2013.01)

(58) Field of Classification Search
None
See application file for complete search history.

(56) References Cited

U.S. PATENT DOCUMENTS

| | | |
|---|---|---|
| 2016/0347787 A1 | 12/2016 | Ng et al. |
| 2017/0152298 A1 | 6/2017 | Banerjee et al. |

FOREIGN PATENT DOCUMENTS

| | | | |
|---|---|---|---|
| CN | 105175548 A | 12/2015 | |
| CN | 109929038 A | 6/2019 | |
| JP | 2019517513 A | 6/2019 | |
| TW | 201829777 A | 8/2018 | |
| WO | WO-2007149334 A2 * | 6/2007 | ............ C12N 9/16 |
| WO | WO-2014110246 A1 * | 7/2014 | .......... A61K 38/465 |
| WO | 2017168296 A1 | 10/2017 | |
| WO | 2018018011 A2 | 1/2018 | |
| WO | 2018116198 A1 | 6/2018 | |

OTHER PUBLICATIONS

Liu et al., mAbs 2:5, 480-499 (Year: 2010).*
Japanese Patent Office, Notice of Refusal for Japanese Patent application No. 2023-118537 issued Sep. 17, 2024.
Aiello, Dr. Lloyd Paul, et al., "Vascular Endothelial Growth Factor in Ocular Fluid of Patients with Diabetic Retinopathy and Other Retinal Disorders," N Engl J Med 1994; 331:1480-1487, DOI: 10.1056/NEJM199412013312203, Dec. 1, 1994.
Rajesh Amin, et al., "Growth Factor Localization in Choroidal Neovascular Membranes of Age-Related Macular Degeneration," Investigative Ophthalmology & Visual Science, Jul. 1, 1994, vol. 35, No. 8.

* cited by examiner

*Primary Examiner* — Christina M Borgeest
(74) *Attorney, Agent, or Firm* — Lisa Mueller; Casmir Jones SC

(57) ABSTRACT

The present invention relates to a method for refining an ophthalmic protein pharmaceutical with an isoelectric point in a particular range by applying cation exchange chromatography or anion exchange chromatography. According to the present invention, high-purity ophthalmic protein pharmaceutical can be produced more economically by applying three or four chromatography processes.

16 Claims, 4 Drawing Sheets

[Fig. 1]
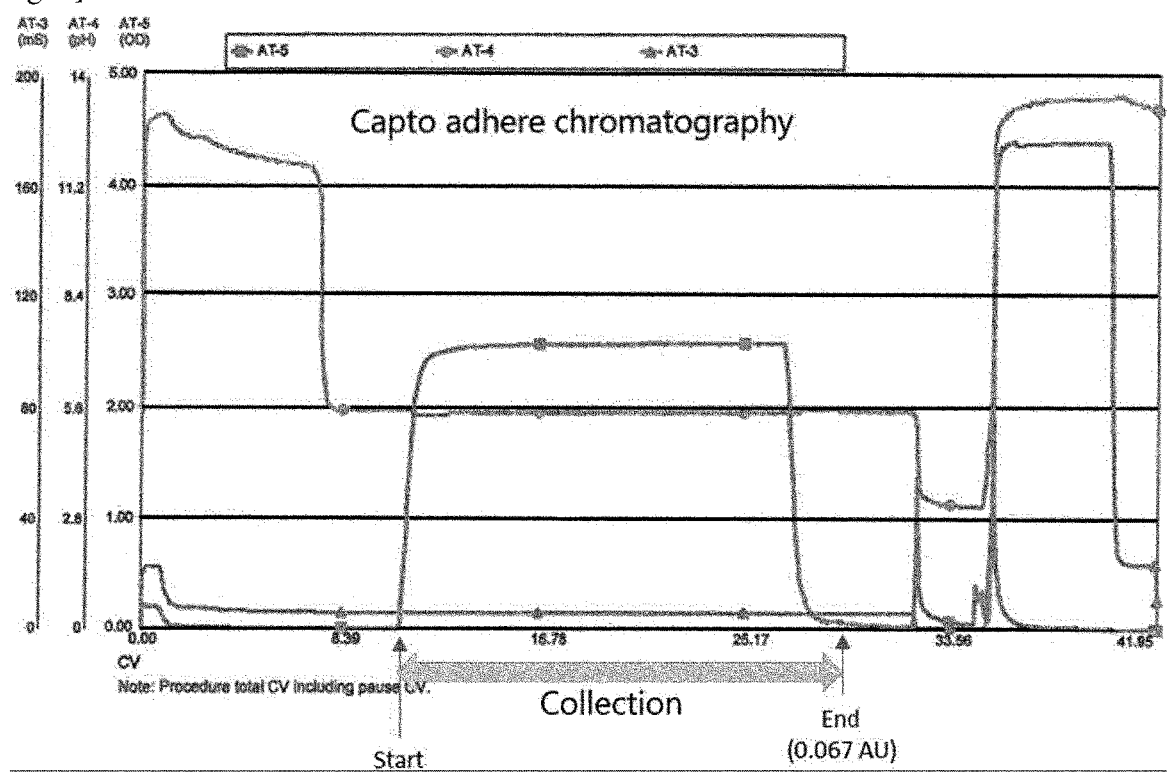

[Fig. 2]
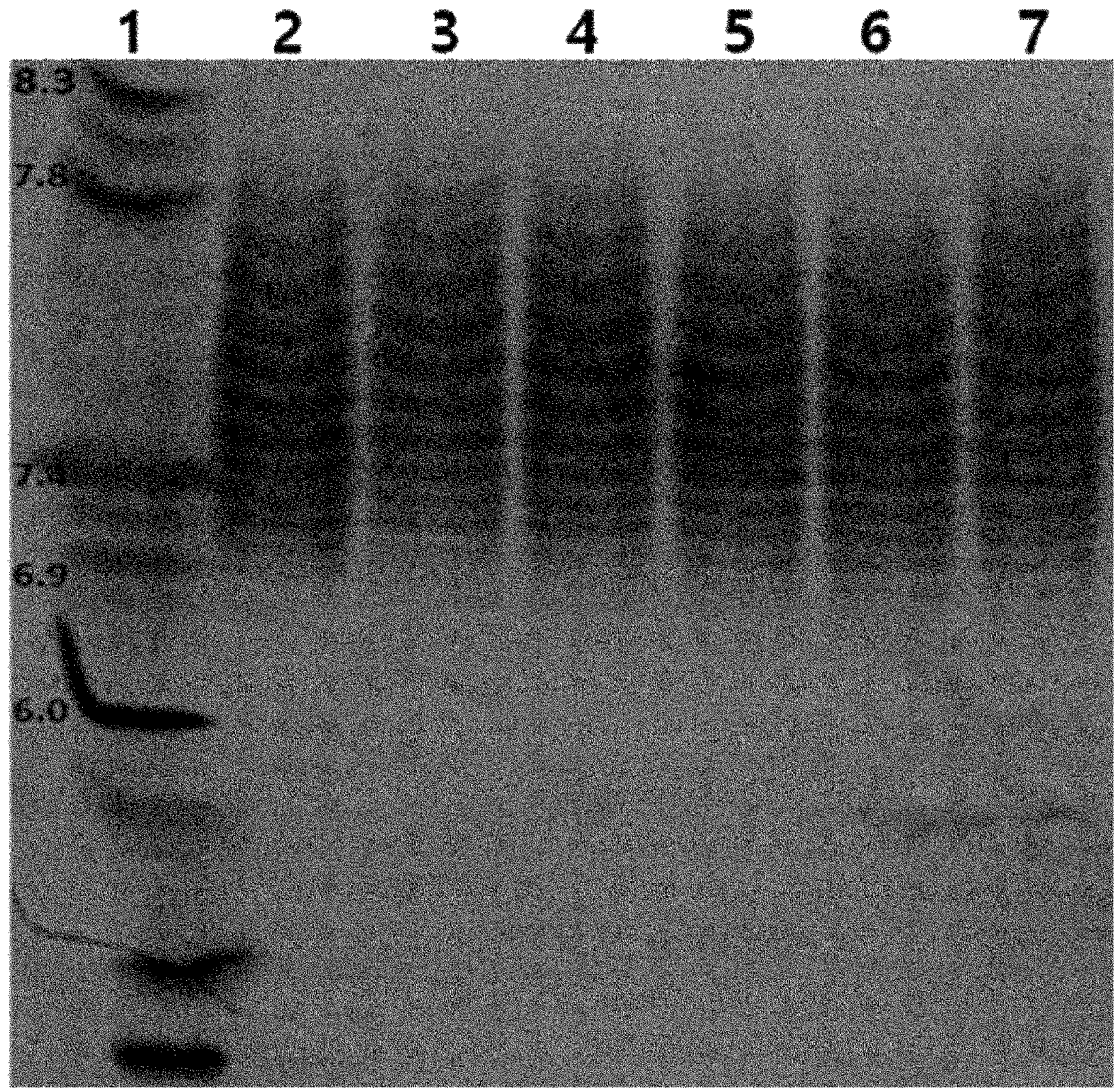

[Fig. 3]
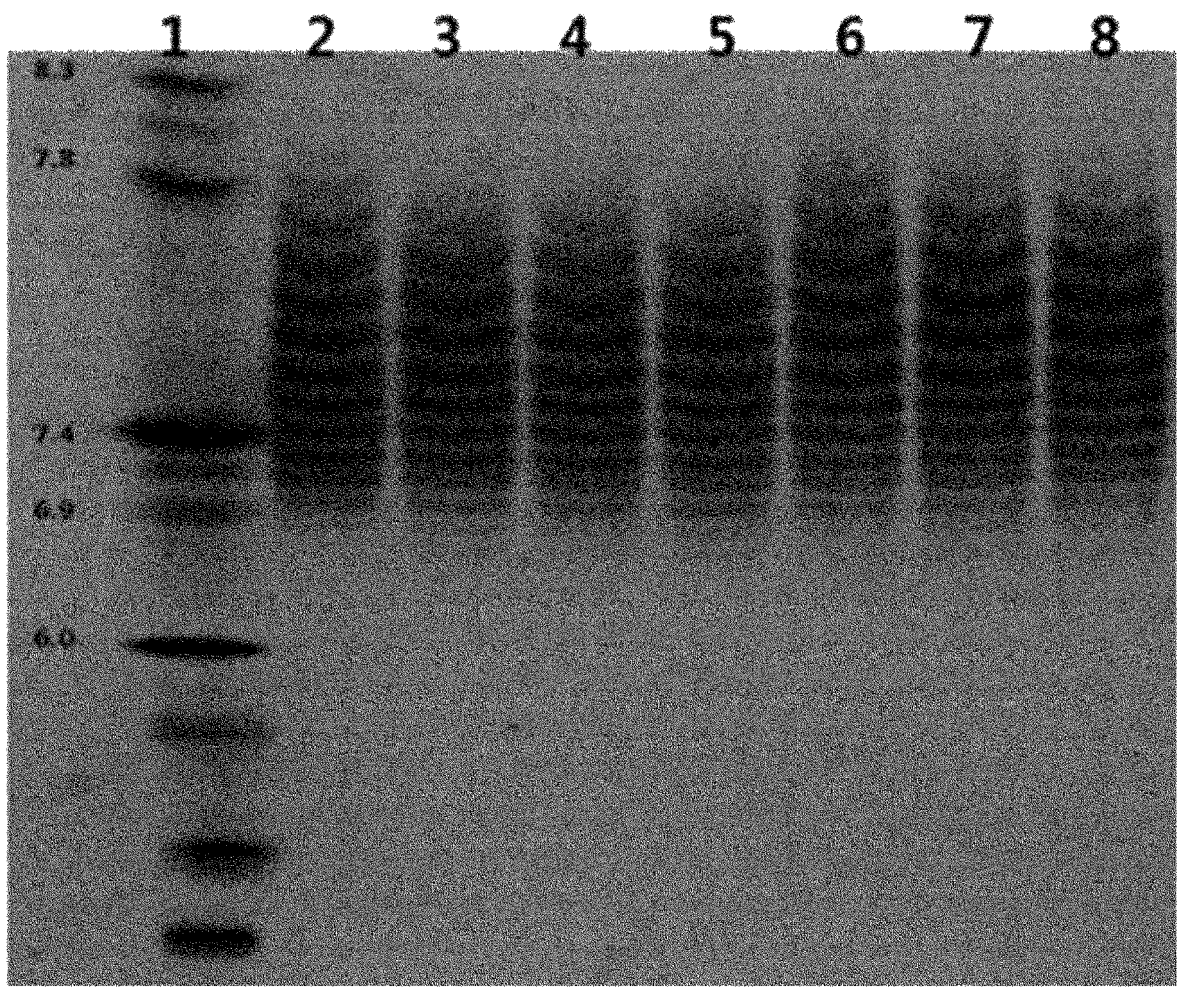

[Fig. 4]
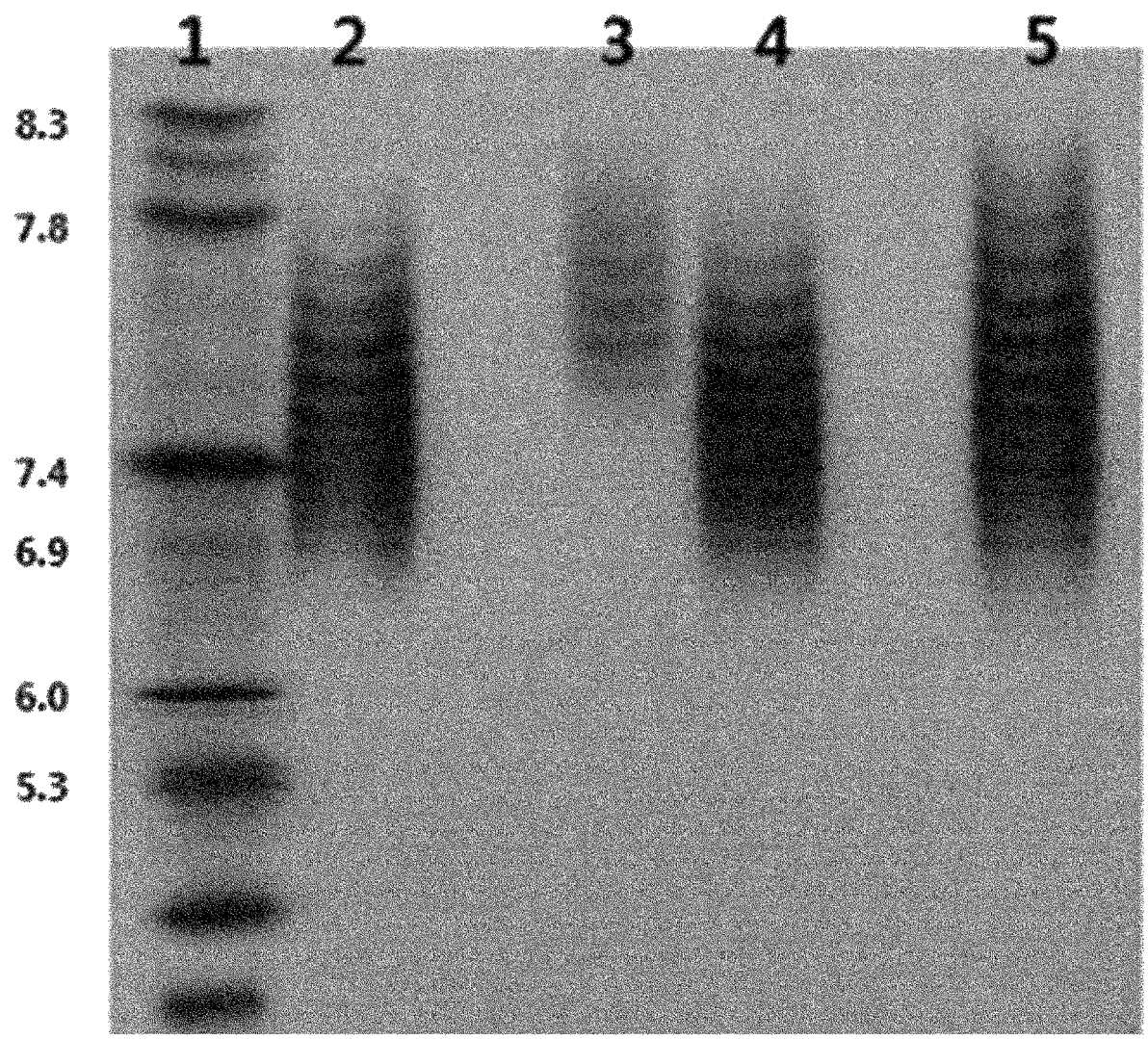

REFINING METHOD OF OPHTHALMIC AFLIBERCEPT

CROSS-REFERENCE TO RELATED APPLICATIONS

This application is a national phase application under 35 U.S.C. § 371 of PCT International Application No. PCT/KR2019/011642, filed Sep. 9, 2019, which claims the benefit of Korean Application No. 10-2019-0082061, filed Jul. 8, 2019, which are herein incorporated by reference.

TECHNICAL FIELD

The present invention relates to a method for refining aflibercept, which is used as an active ingredient of an ophthalmic protein pharmaceutical. According to the present invention, aflibercept with an isoelectric point value in a particular range can be purified by performing cation exchange chromatography or anion exchange chromatography, leading to an improvement in quality and productivity of ophthalmic protein pharmaceuticals.

BACKGROUND ART

Angiogenesis is known to be involved in pathogenesis of various diseases, such as solid tumors, proliferative retinopathies, age-related macular degeneration (AMD), and rheumatoid arthritis. Vascular endothelial growth factor (VEGF), one of the factors needed for the angiogenesis, is expressed in human cancer and also plays a key role in tumor neoangiogenesis. It is also known that a high concentration of VEGF in the eye fluid is highly correlated with angiogenesis activity in diabetic and other ischemic retinopathy patients (Aiello L P, et al., *N Engl J Med* 1994; 331:1480-1487) and leads to localization of growth factors in the choroidal neovascular membranes of age-related macular degeneration (AMD) patients (Amin R1, et al. *Invest Ophthalmol Vis Sci.* 1994 July; 35(8):3178-88). Therefore, anti-VEGF antibodies or VEGF inhibitors may be promising candidates for the treatment of solid tumors and intraocular angiogenesis-related diseases.

Aflibercept, one of the VEGF inhibitors, is a recombinant fusion protein composed of vascular endothelial growth factor (VEGF)-binding portions originated from extra-cellular domains of human VEGF receptors 1 and 2, which are fused to the Fc portion of the human IgG1 immunoglobulin. Aflibercept has been approved in the United States and Europe for the treatment of wet macular degeneration under the trade name Eylea™.

Aflibercept may be expressed in animal cells, such as CHO cells and NS0 cells, by using gene recombination technology. Aflibercept is present in a dimeric form and shows biological activity. The expressed dimer is known to show a form in which glycan structures are bound to a total of ten asparagine residues, and negatively charged sialic acid may be contained in a terminal portion of each of the glycan structures, and thus the aflibercept substances expressed through cell culture show a form of a composite having an isoelectric point value in a very broad range of pH 6.0-10 due to the presence of various contents of sialic acid sugars.

To use, on the human body, protein pharmaceuticals produced using gene recombination technology, extremely strict safety and efficacy verification procedures are needed, and thus such procedures require an effective purification process capable of attaining purification at an extremely high purity level. That is, the culture produced through cell culture contains various contents of the sialic acid sugars as well as impurities originated from a variety of processes, and therefore, a process of refining, therefrom, only proteins with isoelectric point values distributed within a standard set for strict verification of safety and efficacy is required. Furthermore, such proteins can be industrially used only when economic efficiency is secured by ensuring a sufficient refinement yield.

Conventional purification process schemes (or sequences) of antibody drugs or Fc fusion proteins often include a chromatography step of testing the ability of antibody molecules to preferably bind to or be held on a solid phase of a chromatography column when compared with the binding or maintaining strength of various impurities. These chromatography processes are characterized in that a series of chromatography methods including various techniques, such as protein A or protein G immobilized affinity chromatography, immobilized metal affinity chromatography, cation exchange chromatography, anion exchange chromatography, hydrophobic interaction chromatography, size exclusion gel filtration chromatography, mixed-mode or multimodal chromatography, and hydroxyapatite chromatography are performed under predetermined conditions. However, particular conditions of chromatography performed to purify aflibercept (or aflibercept biosimilar) substances at high purity have not been yet revealed.

DISCLOSURE OF INVENTION

Technical Problem

The present inventors tried to complete a series of processes for developing high-purity medicines usable for humans by effectively removing multimers, endotoxins, heterologous proteins and nucleic acids, impurities in the form of high-isoelectric-point analogs, and the like from aflibercept produced from cell culture using animal cell lines.

The present inventors excluded size exclusion chromatography that may have a negative effect on productivity due to limited injectable volumes of samples, and tried to complete a process having an advantage of being unlikely to denature proteins because an organic solvent or the like is not used.

Especially, on the basis of the fact that aflibercept contains a total of ten N-linked glycan structures, which is much more than general antibody medicines, and negatively charged sialic acid is contained in a terminal portion of each of the glycan structures and thus aflibercept shows a form of a composite with an isoelectric point value in a very broad range of pH 6.0-10 due to the presence of various contents of sialic acid sugars, the present inventors tried to provide a technique for refining, at high purity, only substances with an isoelectric point value in a very particular range (pH 6.0-8.3) by performing anion exchange chromatography and cation exchange chromatography in particular conditions.

Solution to Problem

In accordance with an aspect of the present invention, there is provided a cation exchange chromatography method performed by including:
(a) loading an aflibercept mixture onto a cation exchange resin equilibrated with a buffer solution of pH 4.5-6.6;
(b) washing with a buffer solution containing 0-40 mM sodium chloride or potassium chloride in the condition of pH 4.5-6.6; and (c) collecting aflibercept with an isoelectric point in a range of 6.0-8.3 by elution with a buffer solution containing sodium chloride or potassium chloride of 40-120 mM, which is higher than the concentration in step (b) in the condition of pH 4.5-6.6, so that aflibercept with an isoelectric point in a range of 6.0-8.3 can be refined.

The buffer solution used for column equilibration, washing, and elution may be sodium acetate or sodium phosphate buffer.

In addition, a ligand for the cation exchange resin may be a carboxymethyl (CM) group.

In accordance with another aspect of the present invention, there is provided an anion exchange chromatography method performed by including the following:
 (a) loading an aflibercept mixture onto an anion exchange resin equilibrated with a buffer solution of pH 7.5-9.0;
 (b) washing with a buffer solution containing 0-20 mM sodium chloride or potassium chloride in the condition of pH 7.5-9.0; and
 (c) collecting aflibercept with an isoelectric point in a range of 6.0-8.3 by elution with a buffer solution containing sodium chloride or potassium chloride of 20-150 mM, which is higher than the concentration in step (b) in the condition of pH 7.5-9.0, so that aflibercept with an isoelectric point in a range of 6.0-8.3 can be refined.

The buffer solution used for column equilibration, washing, and elution may be sodium phosphate or Tris buffer.

In addition, a ligand for the anion exchange resin may be a quaternary ammonium (Q) group.

At least one selected from the group consisting of protein A affinity chromatography, mixed-mode or multimodal chromatography, and desalting ultrafiltration may be applied before the ion exchange chromatography is performed on the aflibercept mixture.

Furthermore, aflibercept with an isoelectric point in a range of 6.0-8.3 may be refined by performing the cation exchange chromatography method and the anion exchange chromatography method in combination.

In accordance with still another aspect of the present invention, there is provided a method for formulating a final refined aflibercept to have any one of the following three compositions so as to be suitable for intravitreal injection:
 (a) a composition of 10 mM sodium acetate, 7% sucrose, 0.03% polysorbate 20, pH 5.5;
 (b) a composition of 10 mM sodium acetate, 6.5% sucrose, 15 mM sodium chloride, 0.03% polysorbate 20, pH 5.5; and
 (c) a composition of 50 mM sodium acetate, 6% sucrose, 0.03% polysorbate 20, pH 5.5.

The present invention as mentioned above will be described in detail.

An aspect for implementing the present invention is a method for refining aflibercept at high yield and high purity, which is a target protein expressed through cell culture from Chinese hamster ovary (CHO) cells, which are transgenic animal cells.

Since the injectable volume of samples into size exclusion chromatography is limited on an industrial production scale, resulting in a negative effect on productivity, the size exclusion chromatography is excluded in the present invention. Also, excluded are: reversed-phase chromatography that may denature proteins due to the use of organic solvents or the like; and hydrophobic chromatography with a possibility of protein denaturation due to the use of high-concentration salts.

According to a preferable embodiment of the present invention, particular conditions for performing cation exchange chromatography for refining at high purity only substances with an isoelectric point value in a particular range while removing impurities purities in the form of relatively-high-isoelectric-point analogs from aflibercept substances with various isoelectric points caused by heterogeneity in the content of sialic acid present in a terminal of a glycan structure are applied once or more.

According to another preferable embodiment of the present invention, particular conditions for performing anion exchange chromatography for refining at high purity only substances with an isoelectric point value in a particular range while removing impurities in the form of relatively-high-isoelectric-point analogs from aflibercept substances with various isoelectric points caused by heterogeneity in the content of sialic acid present in a terminal of a glycan structure are applied once or more.

According to another preferable embodiment of the present invention, the particular conditions for performing cation exchange chromatography and the particular conditions for performing anion exchange chromatography may be applied together.

In an embodiment, protein A immobilized affinity chromatography, mixed-mode or multimodal chromatography, and ultrafiltration (diafiltration) may be additionally performed before the purification method of the present invention is implemented.

Advantageous Effects of Invention

Features and advantages of the present invention are summarized as follows.
 (a) The present invention provides a novel refining method capable of effectively refining only aflibercept (or aflibercept biosimilar) substances with an isoelectric point value in a range of pH 6.0-8.3.
 (b) The present invention provides a refining method capable of overcoming difficulty caused by physicochemical properties of aflibercept with a very broad range of isoelectric point distribution and mass-producing aflibercept on an industrial scale.
 (c) The present invention provides a refining method capable of mass-producing aflibercept at high yield even without performing ultrafiltration, which corresponds to a buffer exchange procedure that may cause a yield reduction between respective chromatography processes.
 (d) According to the present invention, impure proteins are effectively removed by three or four chromatography processes on the aflibercept substances expressed through cell culture, so aflibercept can be obtained that can be suitably applied for intravitreal administration and intraocular administration to patients with various diseases, such as wet age-related macular degeneration and diabetic macular edema.

BRIEF DESCRIPTION OF DRAWINGS

FIG. 1 is a graph showing the results of performing multimodal chromatography using Capto adhere resin. The fractions obtained during loading and washing are indicated in the bottom on the drawing.

FIG. 2 shows the Coomassie staining results of the isoelectric point electrophoresis containing aflibercept fractions with an isoelectric point value in a range of pH 6.0-8.3 by using cation exchange chromatography in the refining method according to the present invention.
Lane 1: pI marker (SERVA)
Lane 2: Aflibercept internal standard
Lane 3: Cation exchange resin chromatography fraction (Example 1-1)
Lane 4: Cation exchange resin chromatography fraction (Example 1-2)
Lane 5: Cation exchange resin chromatography fraction (Example 1-3)
Lane 6: Cation exchange resin chromatography fraction (Example 1-4)
Lane 7: Cation exchange resin chromatography fraction (Example 1-5)

FIG. 3 shows the Coomassie staining results of the isoelectric point electrophoresis containing aflibercept fractions with an isoelectric point value in a range of pH 6.0-8.3 by using anion exchange chromatography in the refining method according to the present invention.
Lane 1: pI marker (SERVA)
Lane 2: Aflibercept internal standard
Lane 3: Anion exchange resin chromatography fraction (Example 2-1)
Lane 4: Anion exchange resin chromatography fraction (Example 2-2)
Lane 5: Anion exchange resin chromatography fraction (Example 2-3)
Lane 6: Anion exchange resin chromatography fraction (Example 2-4)
Lane 7: Anion exchange resin chromatography fraction (Example 2-5)
Lane 8: Anion exchange resin chromatography fraction (Example 2-6)

FIG. 4 shows the Coomassie staining results of the isoelectric point electrophoresis containing wash and eluate fractions of anion exchange chromatography which was loaded with the elution sample of cation exchange chromatography in the refining method according to the present invention.
Lane 1: pI marker (SERVA)
Lane 2: Aflibercept internal standard
Lane 3: Wash fraction of anion exchange resin chromatography
Lane 4: Eluate fraction of anion exchange resin chromatography
Lane 5: Sample loaded onto anion exchange resin chromatography (eluate of cation exchange resin chromatography)

MODE FOR THE INVENTION

The purification method for aflibercept of the present invention will be described in detail by steps and together with examples. These steps or examples are provided for illustrating the present invention, and the scope of the present invention is not limited thereto.

Step 1: Obtaining Pre-Treatment Solution from Culture of Aflibercept-Expressing Animal Cells First, a pre-treatment solution was obtained by removing animal cells from a culture of aflibercept-expressing animal cells. The aflibercept-expressing animal cells are preferably mammalian, rodent, avian, or insect cells, and more preferably Chinese hamster ovary (CHO), VERO, baby hamster kidney (BHK), and NS0 cells, and most preferably CHO cells.

The aflibercept-expressing animal cells may be cultured by various methods known in the art. For example, at least one selected from the group consisting of batch culture, fed-batch culture, repeated fed-batch culture, continuous culture, and perfusion culture, which are included in CHO cell culture methods known in the art, may be carried out.

Since various proteins, such as proteins, sugars, and fats, are generally incorporated into the cultures of animal cells, a pre-treatment step of removing impurities is needed before column chromatograph is performed in order to increase purification efficiency in the purification method according to the present invention.

Preferably, the pre-treatment step may be performed through various methods known in the art, such as depth filtration and membrane filtration.

Step 2: Refining Aflibercept from Pre-Treated Culture

Before cation exchange chromatography or anion exchange chromatography for refining only aflibercept with an isoelectric point value in a particular range is performed, the pre-treated culture may be purified by at least one method selected from the group consisting of affinity chromatography, mixed-mode or multimodal chromatography, and desalting ultrafiltration, but is not limited thereto.

As for monoclonal antibodies and Fc-fusion proteins, the industry standard for a purification process typically includes a purification process including several steps. In an example of the present invention, the pre-treated culture was subjected to primary purification using protein A affinity chromatography. This is a purification step in which an affinity ligand called protein A binding to Fc-region of antibodies or Fc-fusion proteins is applied. The pre-treated culture was loaded onto protein A column, washed, and then eluted with an acetate or citrate buffer solution of about pH 3, thereby obtaining primarily purified aflibercept fractions.

Protein aggregates or high-molecular protein species are one type of the main impurities that need to be removed from biological pharmaceuticals containing Fc-fusion proteins or antibody molecules. For example, protein aggregates and other contaminants need to be removed from biological pharmaceuticals before products are used for diagnosis, treatment, or other applications. In an example of the present invention, mixed-mode or multimodal chromatography was used, and thus such chromatography was performed by loading the primarily purified fractions on a mixed-mode or multimodal resin without any ultrafiltration process.

The multimodal chromatography in which two or more sites that are different from each other but function together interact with a target protein can be advantageously applied. The eluted pools were subjected to removal of protein aggregates and the other impurities in the culture, thereby obtaining a higher-purity aflibercept substance.

The mixed-mode or multimodal resin used for purification of aflibercept in the present invention is commercially accessible, and examples thereof are Capto MMC™ (GE Healthcare), Capto Adhere™ (GE Healthcare), MBI Hyper-Cel™ (Pall), and the like. Capto Adhere™ contains a ligand having multimodal functionality to impart different selectivity compared with conventional ion exchangers, and shows multi-useful functionality for interacting with a target molecule, such as ion interactions, hydrogen bond interactions, and hydrophobic interactions. It would be obvious to a person skilled in the art that the multimodal resin used in an embodiment of the present invention is Capto Adhere™, but is not limited thereto.

The mixed-mode or multimodal chromatography is performed by a column equilibrating step, a loading step, and an eluting step, and may further include one or more washing steps after the loading step before the eluting step.

The conditions for performing chromatography can be controlled such that high-purity aflibercept substances can be obtained in a manner of not binding to the resin during the loading and washing steps or can be obtained in the eluting step after first binding to the resin. In an example of the present invention, a column (GE healthcare, XK16/20) was filled with 10 mL of Capto adhere (GE healthcare) resin, which was then equilibrated with a 50 mM sodium acetate buffer solution (pH 5.5) containing 20 mM sodium chloride, and a solution flowing out without binding to the resin during the loading step and the washing step (identical to the equilibration buffer solution) as shown in the column chromatography graph in FIG. 1 was collected, so that protein aggregates and other impurities can be effectively removed, and it was possible not to perform an ultrafiltration process, which is performed for exchanging buffer solutions of the loading sample in order to load the loading sample in a next step, ion exchange chromatography.

Step 3: Refining Aflibercept with Isoelectric Point Value in Particular Range

Before cation exchange chromatography or anion exchange chromatography for refining only aflibercept with an isoelectric point value in a particular range is performed, the pre-treated culture may be purified by at least one method selected from the group consisting of affinity chromatography, mixed-mode or multimodal chromatography, and desalting ultrafiltration, but is not limited thereto.

For analysis of isoelectric point patterns, isoelectric focusing was employed. After 20 μg of each of a standard solution and a test solution was prepared, each solution was loaded onto Novex pH 3-10 IEF Gel 1.0 mm, 10 well (Life technologies), and subjected to electrophoresis at 100V, 200V, and 500V for 1 hour, 1 hour, and 30 minutes, respectively. The gel was immobilized with 12% trichloroacetic acid for 30 minutes, washed three times with ultrapure water for 10 minutes for each time, stained with Coomassie staining solution, and then observed.

Hereinafter, performing cation exchange chromatography (example 1), performing anion exchange chromatography (example 2), and performing cation exchange chromatography and anion exchange chromatography in combination will be separately described.

Example 1: Performing Cation Exchange Chromatography (1) Cation Exchange Chromatography Method The aflibercept sample solution collected through protein A affinity chromatography or the aflibercept sample solution collected from protein A affinity chromatography and multimodal chromatography performed together was subjected to cation exchange chromatography to purify only aflibercept substances with an isoelectric point value in a particular range.

Examples of the functional group charged with the cation exchange resin used in the present invention may be carboxymethyl (CM), sulfoethyl (SE), sulfopropyl (SP), phosphate (P), and the like, and examples of the support of the cation exchange resin may be polystyrene, polystyrene/divinyl benzene, cellulose, dextran, agarose, and Toyopearl. An example of the cation exchanger used in the present invention has particularly carboxymethyl (CM).

As a buffer solution used in the cation exchange chromatography process of the present invention, any buffer solution that can have buffering capacity can be used, and examples thereof include sodium citrate, sodium acetate, sodium phosphate, potassium phosphate, and glycine-HCl.

As an equilibration solution, various buffer solutions, especially, sodium acetate and sodium phosphate buffer solutions may be used, and the pH for use is 4.5-6.6. As a washing solution, various buffer solutions, especially, sodium acetate and sodium phosphate buffer solutions may be used, and the pH for use is 4.5-6.6, and the buffer solutions may contain sodium chloride or potassium chloride of a low concentration (a concentration range of 0-40 mM, which means containing no sodium chloride or potassium chloride or, if any, containing sodium chloride or potassium chloride in a concentration range of more than 0 to 40 mM). As an elution solution, various buffer solutions, especially, sodium acetate and sodium phosphate buffer solutions may be used, and the pH for use is 4.5-6.6. It was verified that as the salt concentration of sodium chloride or potassium chloride increased, proteins with lower pI values were first sequentially eluted. In order to purify substances with an isoelectric point of 8.3 or less, it was preferable to carry out elution at a salt concentration of about 120 mM or less.

The present inventors used solutions in a range of pH 4.5-6.6 during the equilibrating, washing, and eluting steps when performing cation exchange chromatography. The reason was that aflibercept substances with a low sialic acid content may be collected in the condition of less than pH 4.5, and aflibercept substances with an isoelectric point value in a particular range (pH 6.0-8.3) may be lost in the condition of more than pH 6.6, resulting in a reduction in purification efficiency.

The steps will be described with reference to specific examples of the present invention as follows. 1) NaCl salt gradient elution and 2) pH gradient elution, as preliminary experiments for finding out suitable pH and salt concentration for pI cutting, were carried out by using Tricon column (GE healthcare, diameter of 0.5 cm, height of 10 cm) filled with 2 mL of CM-Sepharose FF (GE healthcare), which is a kind of weak acid cation exchange resin.

First, as for the NaCl salt gradient elution test, the column was equilibrated with a 50 mM sodium acetate (pH 5.5) equilibration buffer solution for 10 column volume (CV). The aflibercept sample solution obtained by performing protein A affinity chromatography or Capto adhere multimodal chromatography in step 2 as described above was diluted with each equilibration buffer solution, and then the pH of the sample solution was adjusted to be the same as the pH of the equilibration buffer solution. Thereafter, the sample solution was loaded onto the column at a flow rate of 0.3 mL/min. After the column was washed with the same equilibration buffer solution for 5 CV, an elution buffer (50 mM sodium acetate, 0.5 M sodium chloride, pH 5.5) was allowed to flow at 0% to 100% for 30 CV, so that proteins were eluted by an increase in salt concentration and 16 fractions were collected by an automatic fraction collector. The collected fractions were analyzed by isoelectric point electrophoresis, and the results thereof verified that as the salt concentration of sodium chloride increased, proteins with lower pI values were first sequentially eluted. In order to purify substances with an isoelectric point of 8.3 or less, it was preferable to carry out elution at a salt concentration of about 120 mM or less.

As for the pH gradient elution test, the column was equilibrated with an equilibration buffer solution (20 mM sodium acetate, 20 mM sodium phosphate, pH 5.5) for 10 CV, and the aflibercept sample solution was treated by the same method as in the salt concentration gradient elution test. After the column was washed with an equilibration buffer solution for 5 CV, an elution buffer (20 mM sodium acetate, 20 mM sodium phosphate, pH 8.5) was allowed to flow at 0% to 100% for 30 CV, so that proteins were eluted by pH increase and 20 fractions were collected by an automatic fraction collector. The collected fractions were analyzed by isoelectric point electrophoresis, and the results thereof verified that as the pH increased, proteins with lower pI values were first sequentially eluted. As a result of performing the stepwise pH elution condition test to explore more detailed pH conditions, it was found that it was preferable to carry out equilibrating and washing steps of cation exchange chromatography in the condition of pH 6.6 or less, and for the reproducibility of scale-up in the future, the salt concentration increasing elution method, which can implement more stable processes compared with the pH elution method, was selected to complete more precise elution conditions as shown in Table 1.

The resin was equilibrated with the equilibration buffer at a flow rate of 150 cm/h according to the conditions of each example in Table 1. Then, the aflibercept sample solution obtained by performing protein A affinity chromatography or Capto adhere multimodal chromatography in step 2 as described above was diluted with each equilibration buffer solution, and then pH thereof was adjusted to be the same as the pH of the equilibration buffer solution. Thereafter, the sample solution was loaded onto the column filled with CM-Sepharose FF resin at a flow rate of 150 cm/h. Thereafter, according to the condition of each example on Table 1, a washing step was carried out using a washing buffer solution at a flow rate of 150 cm/h, thereby removing aflibercept substances with relatively higher isoelectric point values, and then an elution buffer solution was allowed to flow at a flow rate of 150 cm/h, thereby collecting only aflibercept substances with an isoelectric point value in a particular range (pH 6.0-8.3). The resin used in the test was regenerated with a 0.5 N sodium hydroxide solution, re-equilibrated with each equilibration buffer solution, and then reused.

TABLE 1

Detailed example conditions for CM-Sepharose cation exchange chromatography

| Example | Equilibration buffer solution | Washing buffer solution | Elution buffer solution |
|---|---|---|---|
| 1-1 | 50 mM sodium acetate (pH 4.5) | 50 mM sodium acetate, 40 mM sodium chloride (pH 4.5) | 50 mM sodium acetate, 100 mM sodium chloride (pH 5.5) |
| 1-2 | 20 mM sodium phosphate (pH 6.6) | 20 mM sodium phosphate (pH 6.6) | 20 mM sodium phosphate, 50 mM sodium chloride (pH 6.6) |
| 1-3 | 20 mM sodium phosphate (pH 6.6) | 20 mM sodium phosphate (pH 6.6) | 20 mM sodium phosphate, 45 mM sodium chloride (pH 6.6) |
| 1-4 | 20 mM sodium phosphate (pH 6.6) | 20 mM sodium phosphate (pH 6.6) | 20 mM sodium phosphate, 40 mM sodium chloride (pH 6.6) |
| 1-5 | 50 mM sodium acetate (pH 5.5) | 20 mM sodium phosphate (pH 6.6) | 20 mM sodium phosphate, 50 mM sodium chloride (pH 6.6) |

(2) Cation Exchange Chromatography Results

Various equilibration and washing conditions and elution conditions were tested using CM-Sepharose FF (GE healthcare) resin, which is a kind of weak cation exchange resin. Sodium acetate and sodium phosphate buffer solutions were mainly used as equilibration solutions, and the pH for use was 4.5-6.6. As a washing solution, sodium acetate and sodium phosphate buffer solutions were mainly used, and the pH for use was 4.5-6.6, and the buffer solutions preferably contained sodium chloride or potassium chloride of a low concentration (a concentration range of 0-40 mM, which means containing no sodium chloride or potassium chloride or, if any, containing sodium chloride or potassium chloride in a concentration range of more than 0 to 40 mM). The pH used in the elution solution using sodium acetate and sodium phosphate buffer solutions was 4.5-6.6, and sodium chloride or potassium chloride with higher concentrations (a concentration range of 40-120 mM) was contained in the elution solution. The sodium chloride salt concentration in the elution solution was preferably 40-100 mM, and the respective equilibrating step, loading step, washing step, and eluting step shown on Table 1 were carried out to effectively purify aflibercept substances with almost similar isoelectric point value range (pH 6.0-8.3) to the standard product aflibercept.

The isoelectric point analysis results in Table 2 and FIG. 2 verified that considering the comparison with the standard product aflibercept, chromatography purification using CM-Sepharose FF resin can be effectively used by following the detailed conditions for performing chromatography on Table 1.

The present inventors have found that the fractions in a volume unit corresponding to 1 column volume (CV) were obtained from washes and eluates by using an automatic fraction collector during the washing and eluting steps, and when each of these fractions was analyzed by isoelectric point analysis and then wash and eluate fractions specified to have most similar isoelectric point ranges to the standard product aflibercept were collected, the similarity of the isoelectric point profiles was more easy to secure. Such a fractionation method can be selectively used in the cation exchange chromatography process.

TABLE 2

Purification results of cation exchange chromatography

| Example | Isoelectric point analysis results | IEF gel loading amount (μg) |
|---|---|---|
| 1-1 | Lane 3 in FIG. 2 | 20 |
| 1-2 | Lane 4 in FIG. 2 | 20 |
| 1-3 | Lane 5 in FIG. 2 | 20 |
| 1-4 | Lane 6 in FIG. 2 | 20 |
| 1-5 | Lane 7 in FIG. 2 | 20 |

Example 2: Performing Anion Exchange Chromatography (1) Anion Exchange Chromatography Method The aflibercept sample solution collected through protein A affinity chromatography or the aflibercept sample solution collected from protein A affinity chromatography and multimodal chromatography performed together was subjected to anion exchange chromatography to purify only aflibercept substances with an isoelectric point value in a particular range.

Examples of the functional group charged with the anion exchange resin used in the present invention may be an amine or an amino group, more preferably a primary amine, a secondary amine, a tertiary amine, or a quaternary amine, and most preferably a tertiary amine or a quaternary amine, and examples of the support of the anion exchange resin may be polystyrene, polystyrene/divinyl benzene, cellulose, dextran, agarose, and Toyopearl. An example of the anion exchanger used in the present invention has particularly diethyl aminoethyl (DEAE) and quaternary ammonium (Q) ligands.

As a buffer solution used in the anion exchange chromatography process of the present invention, any buffer solution that can have buffering capacity can be used, and examples thereof include sodium phosphate, potassium phosphate, HEPES, glycine-HCl, and Tris.

As an equilibration solution, various buffer solutions, especially, sodium phosphate and Tris buffer solutions may be used, and the pH may be in a range of 7.5-9.0. As a washing solution, various buffer solutions, especially, sodium phosphate and Tris buffer solutions may be used, and the pH for use is 7.5-9.0, and the buffer solutions may contain sodium chloride or potassium chloride of a low concentration (a concentration range of 0-20 mM, which means containing no sodium chloride or potassium chloride or, if any, containing sodium chloride or potassium chloride in a concentration range of more than 0 to 20 mM). As an elution solution, various buffer solutions, especially, sodium phosphate and Tris buffer solutions may be used. It was verified that as the salt concentration of sodium chloride or potassium chloride increased, proteins with lower pI values were first sequentially eluted. In order to purify substances with an isoelectric point of 8.3 or less, it was preferable to perform elution at a salt concentration of about 150 mM or less.

The present inventors used solutions in a range of pH 7.5-9.0 during the equilibrating, washing, and eluting steps when performing anion exchange chromatography. The reason was that aflibercept substances with an isoelectric point value in a particular range (pH 6.0-8.3) may be lost in the condition of less than pH 7.5, resulting in a reduction in purification efficiency, and aflibercept substances with a low sialic acid content may be collected in the condition of more than pH 9.0.

The steps will be described with reference to specific examples of the present invention as follows. 1) NaCl salt gradient elution and 2) pH gradient elution, as preliminary experiments for finding out suitable pH and salt concentration for pI cutting, were carried out by using Tricon column (GE healthcare, diameter of 0.5 cm, height of 10 cm) filled with 2 mL of Q-Sepharose FF (GE healthcare), which is a kind of strong alkaline anion exchange resin.

First, as for the NaCl salt gradient elution test, the column was equilibrated with a 20 mM Tris (pH 8.5) equilibration buffer solution for 10 column volume (CV). The aflibercept sample solution obtained by performing protein A affinity chromatography or Capto adhere multimodal chromatography in step 2 as described above was diluted with each equilibration buffer solution, and then the pH of the sample solution was adjusted to be the same as the pH of the equilibration buffer solution. Thereafter, the sample solution was loaded onto the column at a flow rate of 0.3 mL/min. After the column was washed with the same equilibration buffer solution for 5 CV, an elution buffer (20 mM Tris, 0.5 M sodium chloride, pH 8.5) was allowed to flow at 0% to 100% for 30 CV, so that proteins were eluted by an increase in salt concentration and 13 fractions were collected by an automatic fraction collector. The collected fractions were analyzed by isoelectric point electrophoresis, and the results thereof verified that as the salt concentration of sodium chloride increased, proteins with higher pI values were first sequentially eluted. In order to purify substances with an isoelectric point of 8.3 or less, it was preferable to carry out elution at a salt concentration of about 150 mM or less.

As for the pH gradient elution test, the column was equilibrated with an equilibration buffer solution (20 mM sodium acetate, 20 mM Tris, pH 8.5) for 10 CV, and the aflibercept sample solution was treated by the same method as in the salt concentration gradient elution test. After the column was washed with an equilibration buffer solution for 5 CV, an elution buffer (20 mM sodium acetate, 20 mM Tris, pH 5.5) was allowed to flow at 0% to 100% for 30 CV, so that proteins were eluted by pH reduction and 25 fractions were collected by an automatic fraction collector. The collected fractions were analyzed by isoelectric point electrophoresis, and the results thereof verified that as the pH decreased, proteins with higher pI values were first sequentially eluted. It was found that chromatography was preferably performed in the condition of pH 7.5 or more since aflibercept proteins with relatively low isoelectric points are not adsorbed on the column in the equilibration and washing conditions of pH 7.5 or less. For the reproducibility of scale-up in the future, the salt concentration increasing elution method, which can implement more stable processes compared with the pH elution method, was selected to complete more precise chromatography conditions as shown in Table 3.

The resin was equilibrated with the equilibration buffer at a flow rate of 150 cm/h according to the conditions of each example in Table 3. Then, the aflibercept sample solution obtained by performing protein A affinity chromatography or Capto adhere multimodal chromatography in step 2 as described above was diluted with each equilibration buffer solution, and then pH thereof was adjusted to be the same as the pH of the equilibration buffer solution. Thereafter, the sample solution was loaded onto the column filled with Q-Sepharose FF resin at a flow rate of 150 cm/h. Thereafter, according to the condition of each example on Table 3, a washing step was carried out using a washing buffer solution at a flow rate of 150 cm/h, thereby removing aflibercept substances with relatively higher isoelectric point values, and then an elution buffer solution was allowed to flow at a flow rate of 150 cm/h, thereby collecting only aflibercept substances with an isoelectric point value in a particular range (pH 6.0-8.3). The resin used in the test was regenerated with a 1N sodium hydroxide solution, re-equilibrated with each equilibration buffer solution, and then reused.

TABLE 3

Detailed example condtions for Q-sepharose anion exchange chromatography

| Example | Equilibration buffer soluion | Washing buffer solution | Elution buffer solution |
|---|---|---|---|
| 2-1 | 20 mM sodium phosphate (pH 7.5) | 20 mM sodium phosphate (pH 7.5) | 20 mM sodium phosphate, 70 mM sodium chloride (pH 7.5) |
| 2-2 | 20 mM Tris (pH 8.5) | 20 mM Tris, 20 mM sodium chloride (pH 8.5) | 20 mM Tris, 80 mM sodium chloride (pH 8.5) |

TABLE 3-continued

Detailed example condtions for Q-sepharose anion exchange chromatography

| Example | Equilibration buffer soluion | Washing buffer solution | Elution buffer solution |
|---|---|---|---|
| 2-3 | 20 mM Tris (pH 8.5) | 20 mM Tris, 20 mM sodium chloride (pH 8.5) | 20 mM Tris, 85 mM sodium chloride (pH 8.5) |
| 2-4 | 20 mM Tris (pH 8.5) | 20 mM Tris, 20 mM sodium chloride (pH 8.5) | 20 mM Tris, 90 mM sodium chloride (pH 8.5) |
| 2-5 | 20 mM Tris (pH 8.5) | 20 mM Tris (pH 7.6) | 20 mM Tris, 60 mM sodium chloride (pH 7.6) |
| 2-6 | 20 mM Tris (pH 8.5) | 20 mM Tris (pH 7.6) | 20 mM Tris, 50 mM sodium chloride (pH 7.6) |

(2) Cation Exchange Chromatography Results

Q-Sepharose FF (GE healthcare) resin, which is a kind of strong alkaline anion exchange resin, was used to test various equilibration, washing, and elution conditions. As an equilibration solution, sodium phosphate and Tris buffer solutions may be especially used, and the pH for use may be in a range of 7.5-9.0. As a washing solution, sodium phosphate and Tris buffer solutions may be used, and the pH for use is in a range of 7.5-9.0, and the buffer solutions preferably contained sodium chloride or potassium chloride of a low concentration (a concentration range of 0-20 mM). As an elution solution, sodium phosphate and Tris buffer solutions may be especially used. In order to purify substances with an isoelectric point of 8.3 or less, it was preferable to perform elution at a salt concentration of 20 mM or more, which is higher than the salt concentration in the washing step and less than 150 mM, and more preferably, the sodium chloride salt concentration in the elution solution was 20-90 mM in the condition of pH 7.5-8.5. It was possible to purify aflibercept in a targeting isoelectric point range even at a salt concentration of 90 mM or more, but as the shape of eluted peaks was relatively sharpened, the difference in isoelectric point value between the collected fractions tended to decrease.

The respective equilibrating step, loading step, washing step, and eluting step shown on Table 3 were carried out to effectively purify aflibercept substances with almost similar isoelectric point value range (pH 6.0-8.3) to the standard product aflibercept. The isoelectric point analysis results in Table 4 and FIG. 3 verified that considering the comparison with the standard product aflibercept, chromatography purification using Q-Sepharose FF resin can be effectively used by following the detailed conditions for performing chromatography on Table 3.

The present inventors have found that the fractions in a volume unit corresponding to 1 column volume (CV) were obtained from washes and eluates by using an automatic fraction collector during the washing and eluting steps, and when each of these fractions was analyzed by isoelectric point analysis and then wash and eluate fractions specified to have most similar isoelectric point ranges to the standard product aflibercept were collected, the similarity of the isoelectric point profiles was more easy to secure. Such a fractionation method can be selectively used in the anion exchange chromatography process.

TABLE 4

Purification results of anion exchange chromatography

| Example | Isoelectric point analysis results | IEF gel loading amount (μg) |
|---|---|---|
| 2-1 | Lane 3 in FIG. 3 | 20 |
| 2-2 | Lane 4 in FIG. 3 | 20 |
| 2-3 | Lane 5 in FIG. 3 | 20 |
| 2-4 | Lane 6 in FIG. 3 | 20 |
| 2-5 | Lane 7 in FIG. 3 | 20 |
| 2-6 | Lane 8 in FIG. 3 | 20 |

Example 3: Performing Cation Exchange Chromatography and Anion Exchange Chromatography in Combination The aflibercept sample solution collected through protein A affinity chromatography or the aflibercept sample solution collected from protein A affinity chromatography and multimodal chromatography performed together was subjected to combinative application of cation exchange chromatography and anion exchange chromatography to purify only aflibercept substances with an isoelectric point value in a particular range.

That is, chromatography with CM-Sepharose FF resin as a cation exchange resin was first performed and then chromatography with Q-Sepharose FF resin as an anion exchange resin was performed according to the method of Example 1, or chromatography with Q-Sepharose FF resin as an anion exchange resin was first performed and then chromatography with CM-Sepharose FF resin as a cation exchange resin was performed, so that only aflibercept substances with an isoelectric point value in a particular range (pH 6.0-8.3) can be purified more easily and the purification efficiency can also be increased compared with when an ion exchange chromatography was performed alone.

The combinative application wherein chromatography with CM-Sepharose FF resin as a cation exchange resin was performed and then chromatography with Q-Sepharose FF resin as an anion exchange resin was performed will be described in detail as follows. For sequential chromatography application, it is advantageous to lower each of the salt concentrations of the washing buffer solution and elution buffer solution to 0-30 mM. The column (GE healthcare, XK16/20) filled with 10 mL of CM-Sepharose FF resin was equilibrated with an equilibration buffer solution (50 mM sodium acetate, pH 5.5) at a flow rate of 1 mL/min. Then, the aflibercept sample solution obtained by performing protein A affinity chromatography or Capto adhere multimodal chromatography in step 2 as described above was diluted with an equilibration buffer solution, and then pH thereof was adjusted to be the same as the pH of the equilibration buffer solution. Thereafter, the sample solution was loaded onto the column filled with CM-Sepharose FF resin at a flow rate of 1 m/min. After the equilibration buffer solution was allowed to flow with 3 column volumes (CV), a washing step was carried out using a washing buffer solution at a flow rate of 1 mL/min to remove aflibercept substances with relatively high isoelectric point values, and then fractionation using an automatic fraction collector was carried out while an elution buffer solution (20 mM sodium phosphate, 50 mM sodium chloride, pH 6.5) was allowed to flow at a flow rate of 1 mL/min. After only aflibercept substances with an isoelectric point values in a particular range (pH 6.0-9.0) were collected, the sample was 10-fold diluted with an equilibration buffer solution in the Q-Sepharose chromatography process, and adjusted to pH 8.5. The column (GE healthcare, XK16/20) filled with 10 mL of Q-Sepharose FF resin, which is a kind of strong alkaline anion exchange resin, was equilibrated with an equilibration buffer solution (10 mM Tris, pH 8.5) at a flow rate of 1 mL/min. Then, the aflibercept sample solution prepared after cation exchange chromatography was loaded onto the column at a flow rate of 1 mL/min. Thereafter, a washing step was carried out using a washing buffer solution of 10 mM Tris (pH 8.5) containing 20 mM sodium chloride at a flow rate of 1 mL/min to remove aflibercept substances with relatively high isoelectric point values, and then the elution buffer solution (10 mM Tris, 120 mM sodium chloride, pH 8.5) was allowed to flow at a flow rate of 1 mL/min to collect only aflibercept substances with an isoelectric point value in a particular range (pH 6.0-8.3).

The purification yield of aflibercept with an isoelectric point value in a particular range through combinative application of cation exchange chromatography and anion exchange chromatography in Example 3 showed a high value by about 15-30% compared with cation exchange chromatography or anion exchange chromatography performed alone, and as can be seen from the isoelectric point analysis results in FIG. 4, aflibercept substances with a very similar isoelectric point distribution compared with the standard product can be produced.

Step 4: Preparing Final Stock Solution Through Formulation

In order to prepare a stock solution by finally formulating the aflibercept solution with isoelectric point of pH 6.0-8.3, which was collected through the purification of cation exchange chromatography, anion exchange chromatography, or combined cation/anion exchange chromatography, the aflibercept solution was concentrated using Vivaspin (Sartorius, MWCO 50 kDa), and then replaced by a formulating buffer solution through repetitive addition of formulating buffer solutions. Last, polysorbate 20 was added to a content of 0.03%, thereby preparing a final stock solution containing aflibercept with a content of about 40 mg/mL. For the composition of the formulating buffer solution, a composition of 10 mM sodium acetate, 7% sucrose, 0.03% polysorbate 20, pH 5.5 may be selected, or as a composition having an increased salt concentration for improvement of long-term stability, a composition of 10 mM sodium acetate, 6.5% sucrose, 15 mM sodium chloride, 0.03% polysorbate 20, pH 5.5 or a composition of 50 mM sodium acetate, 6% sucrose, 0.03% polysorbate 20, pH 5.5 may be selected. Sterilizing filtration was carried out using 0.22 μm PES membrane.

As set forth above, the present invention provides a method for refining aflibercept with an isoelectric point value in a particular range by performing cation exchange chromatography or anion exchange chromatography under particular conditions thereof, and ultimately, provides advantages that high-purity ophthalmic protein pharmaceuticals can be produced more economically through the process including steps 1 to 4.

While the present invention has been described with reference to the particular illustrative embodiments, a person skilled in the art to which the present invention pertains can understand that the present invention may be embodied in other specific forms without departing from the technical spirit or essential characteristics thereof. Therefore, the embodiments described above should be construed as being exemplified and not limiting the present invention. The scope of the present invention is not defined by the detailed description as set forth above but by the accompanying claims of the invention, and it should also be understood that all changes or modifications derived from the definitions and scopes of the claims and their equivalents fall within the scope of the invention.

The invention claimed is:

1. A method for refining aflibercept with an isoelectric point in a range of 6.0-8.3 by performing an anion exchange chromatography after a cation exchange chromatography,
   wherein the steps of cation exchange chromatography includes the following steps:
   (a-1) loading an aflibercept mixture onto a cation exchange resin equilibrated with a buffer solution of pH 4.5-6.6;
   (a-2) washing with a buffer solution containing 0-40 mM sodium chloride or potassium chloride at a pH 4.5-6.6; and
   (a-3) collecting aflibercept with an isoelectric point in a range of 6.0-8.3 by elution with a buffer solution containing sodium chloride or potassium chloride of 40-120 mM at a pH 4.5-6.6, which is higher than the concentration in step (a-2); and
   wherein the steps of anion exchange chromatography includes the following steps:
   (b-1) loading the aflibercept with an isoelectric point in a range of 6.0-8.3 in step (a-3) onto an anion exchange resin equilibrated with a buffer solution of pH 7.5-9.0;
   (b-2) washing with a buffer solution containing 0-20 mM sodium chloride or potassium chloride at a pH 7.5-9.0; and
   (b-3) collecting aflibercept with an isoelectric point in a range of 6.0-8.3 by elution with a buffer solution containing sodium chloride or potassium chloride of 20-150 mM at a pH 7.5-9.0, which is higher than the concentration in step (b-2).

2. The method of claim 1, wherein the buffer solution in the steps (a-1), (a-2) and (a-3) is at least one selected from the group consisting of sodium acetate and sodium phosphate buffer, and wherein the buffer solution in the steps (b-1), (b-2) and (b-3) is at least one selected from the group consisting of sodium phosphate and Tris buffer.

3. The method of claim 1, wherein a ligand for the cation exchange resin is a carboxymethyl (CM) group.

4. The method of claim 1, wherein a ligand for the anion exchange resin is a quaternary ammonium (Q) group.

5. The method of claim 1, wherein at least one selected from the group consisting of protein A affinity chromatography, mixed-mode or multimodal chromatography, and desalting ultrafiltration is applied before the cation exchange chromatography is performed on the aflibercept mixture.

6. The method of claim 1, wherein at least one selected from the group consisting of protein A affinity chromatography, mixed-mode or multimodal chromatography, and desalting ultrafiltration is applied before the anion exchange chromatography is performed on the aflibercept mixture.

7. The method of claim 1, wherein the buffer solution in step (b-3) contains 20-90 mM sodium chloride or potassium chloride.

8. The method of claim 1, wherein the buffer solution in step (b-3) contains 20-90 mM sodium chloride or potassium chloride and pH is 7.5-8.5.

9. A method for refining aflibercept with an isoelectric point in a range of 6.0-8.3 by performing a cation exchange chromatography after an anion exchange chromatography,
   wherein the steps of anion exchange chromatography includes the following steps:

(b-1) loading an aflibercept mixture onto an anion exchange resin equilibrated with a buffer solution of pH 7.5-9.0;

(b-2) washing with a buffer solution containing 0-20 mM sodium chloride or potassium chloride at a pH 7.5-9.0; and (b-3) collecting aflibercept with an isoelectric point in a range of 6.0-8.3 by elution with a buffer solution containing sodium chloride or potassium chloride of 20-150 mM at a pH 7.5-9.0, which is higher than the concentration in step (b-2); and wherein the steps of cation exchange chromatography includes the following steps:

(a-1) loading the aflibercept with an isoelectric point in a range of 6.0-8.3 in step (b-3) onto a cation exchange resin equilibrated with a buffer solution of pH 4.5-6.6;

(a-2) washing with a buffer solution containing 0-40 mM sodium chloride or potassium chloride at a pH 4.5-6.6; and (a-3) collecting aflibercept with an isoelectric point in a range of 6.0-8.3 by elution with a buffer solution containing sodium chloride or potassium chloride of 40-120 mM at a pH 4.5-6.6, which is higher than the concentration in step (a-2).

10. The method of claim 9, wherein the buffer solution in the steps (a-1), (a-2) and (a-3) is at least one selected from the group consisting of sodium acetate and sodium phosphate buffer, and wherein the buffer solution in the steps (b-1), (b-2) and (b-3) is at least one selected from the group consisting of sodium phosphate and Tris buffer.

11. The method of claim 9, wherein a ligand for the cation exchange resin is a carboxymethyl (CM) group.

12. The method of claim 9, wherein a ligand for the anion exchange resin is a quaternary ammonium (Q) group.

13. The method of claim 9, wherein at least one selected from the group consisting of protein A affinity chromatography, mixed-mode or multimodal chromatography, and desalting ultrafiltration is applied before the cation exchange chromatography is performed on the aflibercept mixture.

14. The method of claim 9, wherein at least one selected from the group consisting of protein A affinity chromatography, mixed-mode or multimodal chromatography, and desalting ultrafiltration is applied before the anion exchange chromatography is performed on the aflibercept mixture.

15. The method of claim 9, wherein the buffer solution in step (b-3) contains 20-90 mM sodium chloride or potassium chloride.

16. The method of claim 9, wherein the buffer solution in step (b-3) contains 20-90 mM sodium chloride or potassium chloride and pH is 7.5-8.5.

* * * * *